United States Patent Office 2,885,318
Patented May 5, 1959

2,885,318

WET STRENGTH CELLULOSIC WEB AND METHOD OF MAKING THE SAME

Yun Jen and Sewell T. Moore, Stamford, and Tzeng Jiueq Suen, New Canaan, Conn., assignors to American Cyanamid Company, New York, N.Y., a corporation of Maine No Drawing. Application July 11, 1956
Serial No. 597,086

17 Claims. (Cl. 162—167)

This is in continuation in part of our copending application Serial No. 435,932, filed on June 10, 1954, and now abandoned.

The present invention relates to cellulosic webs including paper of improved wet and dry tensile strength composed of cellulosic fibers bonded together by a content of a novel normally water-soluble, thermo-setting poly(methylolcarbamyl) polyalkylenepolyamine resin in thermo-cured form, and to methods for the manufacture of such webs by use of a colloidal cationic aqueous dispersion of such resin.

Adsorption of only about 1% to 2% (based on the dry weight of the fibers) of preferred resins of the present invention imparts to the paper a wet tensile strength equal to about one-half of its dry strength, and increases its dry tensile strength by about 30%–40%. So far as is known, these results have not heretofore been attained by any resin.

The present invention is based upon the discovery that paper of greatly enhanced wet strength and of considerably enhanced dry strength is obtained when the paper has a content of a normally hydrophilic poly(methylolcarbamyl) polyalkylenepolyamine resin in thermo-cured form.

This resin in normal form is a high molecular weight essentially acyclic polyalkylenepolyamine carrying a sufficient proportion of methylolcarbamyl groups of the formula —C(:X)NHCH$_2$OH (wherein X designates sulfur or oxygen) to render the resin thermo-setting. The molecular size of the combined polyalkylenepolyamine content of the resin in normal unreacted form (i.e., the molecular size of the free polyalkylenepolyamine to which the methylolcarbamyl groups are attached) is such that a 33% by weight aqueous solution of the polyalkylenepolyamine has a viscosity of at least B at 25° C. on the Gardner-Holdt scale. One preferred form of the poly(methylolcarbamyl) polyalkylenepolyamine resin may be prepared by reacting a high molecular weight polyalkylenepolyamine having a molecular size such that an aqueous solution containing 33% by weight of resin solids has a viscosity of at least B at 25° C. on the Gardner-Holdt scale in the form of a substantially complete salt with an alkali metal cyanate or thiocyanate, and then reacting the product with formaldehyde at an alkaline pH.

The resin may be prepared by a variety of processes and the particular process by which the resin is made is not a primary feature of the invention.

The overall process for the preparation of this resin according to one preferred embodiment comprises four principal steps.

(1) In the first step, an alkylenepolyamine having an alkylene group of 2–4 carbon atoms is reacted with a dichloroalkane containing not more than a total of 4 carbon atoms and containing at least 2 and not more than 3 carbon atoms between the chlorine atoms thereof. The alkylenepolyamines include equivalent polyalkylenepolyamines, that is, polyalkylenepolyamines composed of similar linkages. The reaction is run at least to substantial completion, so that the product contains substantially no organically-bound chlorine. Preferably, but not necessarily, the amine and the dichloroalkane are selected so that the number of the carbon atoms between the chlorine atoms of the dichloroalkane plus the number of linear carbon atoms in the alkylene group in the amine is at least 5. The amount of dichloroalkane employed is broadly that which, when substantially completely reacted, is sufficient to form a polyalkylenepolyamine which as an aqueous syrup containing 60%–65% total solids has a viscosity substantially higher than $Z_3$ on the Gardner-Holdt scale at 25° C., equivalent to a viscosity of more than about B when diluted with water to 33% resin solids. The polyalkylenepolyamines employed in the present invention have a molecular size or length so great that it is not convenient to determine their viscosity at 60%–65% solids, and they are therefore hereinafter described in terms of their viscosity at 33% resin solids. Attainment of this high viscosity, indicative of greater molecular size or chain length, is best explained on the assumption that the high molecular weight polyalkylenepolyamine thus formed contains a decreased proportion of six-membered alicyclic rings than would otherwise be the case.

(2) The polyalkylenepolyamine is then neutralized with an acid to the extent of at least 80%.

(3) The high molecular weight polyalkylenepolyamine salt is then reacted with an alkali metal cyanate or thiocyanate.

(4) The resulting polyalkylenepolyamine is rendered thermosetting by reaction, preferably at an alkaline pH, with formaldehyde.

The novel resins prepared as aforesaid are complex polymers, the structure of which has not been completely determined, as a result of which they are most conveniently defined by their method of preparation.

It will thus be seen that the cellulosic webs of the present invention are composed of felted cellulosic fibers bonded together with a small content of a thermo-setting poly(methylolcarbamyl) polyalkylenepolyamine resin in thermo-cured form. The preferred type of resin corresponds to that formed by completely reacting a particular alkylenepolyamine with a particular dichloroalkane to form a high molecular weight polyalkylenepolyamine, reacting the high molecular weight polyalkylenepolyamine thus formed with a compound selected from the group consisting of the alkali metal cyanates and thiocyanates and further reacting with formaldehyde. The amount of cyanate (or thiocyanate) and formaldehyde reacted is at least sufficient to convert the thermoplastic, that is, non-thermo-setting high molecular weight polyalkylenepolyamine into a thermo-setting resin. The particular alkylenepolyamine is one of the alkylene groups of which have at least 2 and not more than 4 linear carbon atoms. The particular dichloroalkane is one which contains a total of not more than 4 carbon atoms and contains at least 2 and not more than 3 carbon atoms between the chlorine atoms thereof. In selecting the particular alkylene polyamine and the particular dichloroalkane, the number of carbon atoms between the chlorine atoms of the dichloroalkane plus the number of linear alkylene carbon atoms of the alkylenediamine is at least 5. The amount of dichloroalkane employed based on the amount of alkylenepolyamine taken is at least sufficient so that the high molecular weight polyalkylenepolyamine formed on completion of the reaction has a viscosity between about B and T on the Gardner-Holdt scale as an aqueous solution at 25° C. containing 33% by weight of resin solids.

The "resin solids" content of the high molecular weight polyalkylenepolyamine solution obtained by reacting the alkylenepolyamine with the dichloroalkane is determined by totaling the weight of the materials employed and any water added, deducting the weight of the hydrogen chloride formed, and dividing by the total weight of the solution.

The cellulosic webs are most conveniently manufactured by first forming a dilute aqueous dispersion or solution of the resin. No aging or pH adjustment is required. The solution is then added to an aqueous suspension of normally beaten cellulosic fibers. The resin in substantial part is rapidly adsorbed by the fibers. The fibers are sheeted in the ordinary way and the resulting webs heated to dry the same and develop the strengthening properties of the resin. Alternatively, the resin may be applied by the tub-sizing method wherein a preformed cellulosic web is dipped into or sprayed or padded with a dilute solution of the resin. The paper is then heated and dried as described.

A noticeable improvement in wet strength takes place when the paper carries as little as 0.01% by weight of the resin. Up to about 5% of the resin may be added with continued increase in the wet strength developed, but the greatest increase in strength produced per unit weight of resin added takes place within the range of about ¼% to about 1%. The latter range is therefore particularly advantageous.

Curing of the resin takes place rapidly at any temperature between about 190°–260° F. and curing is substantially (about 75%) complete when the paper is heated within that temperature range for a time only sufficient to dry the same. It is a particularly advantageous characteristic of the resin that the remainder of the curing takes place at room temperature and is practically complete within 10–14 days. As a result, the process of the present invention does not require any extended high temperature cure. Curing takes place more rapidly under acid conditions and, therefore, in normal operations the suspension is sheeted at pH values less than 7 and preferably about 4–6.

The resins of the present invention are insensitive to the presence of normal amounts of dissolved sulfate ions and thus the suspension may be made acid by addition of aluminum sulfate or sulfuric acid. Hence the resins are particularly advantageously employed in systems wherein the fibers are sized with rosin or other soap or anionic size which is precipitated by alum, which furnishes large amounts of sulfate ions. In such systems, the anionic size may be added first, then the alum which precipitates the size and acidifies the fibrous suspension to about pH 4–6, and finally the wet strength resin of the present invention is added at a point near the papermaking wire.

The alkylenepolyamines referred to above may be alkylenediamines as represented by 1,2-ethylenediamine, trimethylenediamine, 1,2- and 1,3-propylenediamine, and 1,2-, 1,3- and 1,4-butylenediamines. They should contain at least 2, but not more than 4 linear carbon atoms, longer alkylene groups resulting in resins of inadequate solubility or development of paper of inferior wet strength. The alkylene groups may be substituted by non-ionic groups, but the alkylenepolyamine, as a whole, should be water-soluble. As starting materials, there may equally well be employed the equivalent lower polyalkylenepolyamines derived therefrom such as diethylenetriamine, triethylenetetramine, and tetraethylenepentamine, as well as the corresponding polypropylene polyalkylenepolyamines such as tripropylenetetramine of the formula

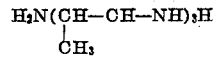

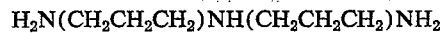

There has recently come on the market a compound known as 3,3'-iminobisproylamine of the formula $$H_2N(CH_2CH_2CH_2)NH(CH_2CH_2CH_2)NH_2$$

This material is also a polyalkylenepolyamine and is equally useful. The alkylenepolyamines may also carry aminoalkyl groups as exemplified 3,3',3''-nitrilotrispropylamine of the formula $$N(CH_2CH_2CH_2NH_2)_3$$

The preferred amines are those which are essentially composed of the lower alkylene linkages such as —HN—CH$_2$CH$_2$NH— or —HN—CH$_2$CH$_2$CH$_2$NH— since these amines are readily available, freely water-soluble, and yield ultimate resins giving the best wet strength.

Equally advantageously, there may be employed the higher molecular size polyalkylenepolyamines, which may have any molecular size so long as they are short of the gel stage. Such polyalkylenepolyamines may be prepared by condensing the foregoing polyalkylenepolyamines with an appropriate dihaloalkane.

The dichloroalkanes employed in the present invention are those which contain a total of not more than about 4 carbon atoms and contain at least 2 and not more than 3 carbon atoms between the chlorine atoms. Representative compounds are 1,2-dichloroethane, 1,2-dichloropropane, 1,3-dichloropropane, and 1,3-dichlorobutane. The bromo- and iodo-analogues of these compounds are equivalents, and are therefore included within the scope of the present invention.

It is a most important feature of the present invention that by far the best results are obtained when the number of the linear carbon atoms of the dichloroalkane (i.e., the number of carbon atoms between the chlorine atoms thereof) plus the number of linear carbon atoms in the alkylene groups of the alkylenediamine is at least 5. It has been discovered that when the number is fewer, six-membered alicyclic rings tend to form which seriously interfere with the process of molecular growth. Thus, diethylenetriamine which contains 2 linear alkylene carbon atoms may be reacted with 1,3-dichloropropane which contains 3 linear carbon atoms thereof to yield a high molecular weight polyalkylenepolyamine suitable for the practice of the present invention. Such high molecular weight polyalkylenepolyamine, while cross-linked to some degree, is in large measure a linear polyazaalkane composed of the linkage

—HN—CH$_2$CH$_2$—NH—CH$_2$CH$_2$CH$_2$—

On the other hand, the reaction of diethylenetriamine with 1,2-dichloroethane yields a polyalkylenepolyamine of decreased chain length.

This phenomenon is best explained on the assumption that interaction of these two materials favors the formation of resins containing a large proportion of six-membered rings illustrated by the formula

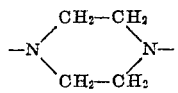

which prevent development of long polyalkylenepolyamine chains. Moreover, ring formation favors the formation of tertiary nitrogen atoms as shown in the formula. Tertiary nitrogen atoms do not react with either potassium cyanate or formaldehyde and therefore are disadvantageous for converting the high molecular weight polyalkylenepolyamine into thermo-setting form.

Regardless of explanation, it is a fact that for best results the interaction of 2-linear carbon amines with 2-linear carbon dihaloalkanes should be avoided. It is evident therefore that 1,3-dichloropropane may be very advantageously reacted with either 3,3'-iminobispropylamine, resulting in formation of a resin entirely free from six-membered alicyclic rings, or with diethylenetriamine, resulting in formation of a polyalkylenepolyamine containing substantially fewer six-membered alicyclic groups as compared to those present in the diethylenetriamine-1,2-dichloroethane reaction product.

It will be realized that when a compound containing three linear carbon atoms such as trimethylenediamine is reacted with a compound containing 2 linear atoms such as 1,2-dichloroethane or 1,2-dichloropropane, a chain is formed which contains ethylene linkages, and that the 1,2-dichloroethane or the 1,2-dichloropropane may react with the nitrogen atoms terminating these ethylenic linkages and thus form six-membered rings. Repeated laboratory tests, however, have shown that about a 4-fold difference exists between the wet strength imparted by resins formed by reacting a 2-linear carbon polyamine with a 2-linear carbon dihaloalkane and the wet strength imparted by resins formed by reacting a 3-linear carbon polyamine (or dihaloalkane) with a 2-linear carbon dihaloalkane (or polyamine) according to a preferred embodiment of the present invention. It is thus evident that such ring formation occurs only to a very limited or minimal extent, if at all.

Synthesis of the resins of the present invention from commonly available reagents is most conveniently performed in four steps.

In the first step, a suitable dichloroalkane is substantially completely reacted with a suitable alkylenepolyamine to form a water-soluble high molecular weight polyalkylenepolyamine having a viscosity between B and T on the Gardner-Holdt scale as an aqueous solution at 25° C. containing 33% by weight of resin solids.

The size of the polyalkylenepolyamine macromolecule developed by reaction of the dihaloalkane with the alkylenepolyamine is governed both by the initial molecular size of the alkylenepolyamine itself, the number of nitrogen atoms therein, and the amount of the dihaloalkane reacted. As a result, the optimum amount of dihaloalkane varies from case to case, and cannot be conveniently stated numerically.

Since a principal function of the dichloroalkane is to combine the polyalkylenepolyamine into a high molecular weight condensate, it is evident that less of the dichloroalkane is required when the molecular weight of the polyalkylenepolyamine selected for the reaction is high than when it is low. Thus, in the case of the high molecular weight polyalkylenepolyamines formed by condensation of lower polyalkylenepolyamines with small amounts of suitable dichloroalkanes, as little as 0.5–0.6 mol is often sufficient to form sufficient polyalkylene polyamines of useful molecular size, the reaction being heterogeneous. On the other hand, particularly in the case of the simplest amines such as ethylenediamine and trimethylenediamine, up to about 1.2 mols of the dihaloalkane often gives best results. In most instances it is most convenient to employ the commercially available polyalkylenepolyamines, that is, amines of the formula

wherein Y represents H or $C_mH_{2m}NH_2$, $m$ is between 2 and 4, and $p$ is 1 to 4. In such case between about 0.65 and 1.0 mol of the dihaloalkane per mol of the polyalkylenepolyamine generally gives very good results.

All of the foregoing polyamines and dichloroalkanes are known as well as numerous methods for their synthesis.

It will be apparent that in large molecules of the size described, small amounts of alkylenepolyamines or dichloro- or other chlor- alkanes may be tolerated within small limits without significant detriment to the wet tensile strength of the paper produced. The introduction of minor amounts of such normally undesirable constituents is therefore embraced within the scope of the present invention.

The most convenient method of determining the amount of dichloroalkane to be added in each instance is by laboratory trial, satisfactory results being attained when the product (as an aqueous solution containing 33% by weight of free polyalkylenepolyamine) has the necessary minimum viscosity. An insufficiency in the amount of the dichloroalkane is evidenced by too low a viscosity. The presence of too much combined dichloroalkane is evidenced by attainment of a viscosity greater than about T, this viscosity approaching gel formation. Excellent results are obtained when sufficient of the dichloroalkane is employed to give a product which, at the resin solids content mentioned, exceeds the viscosity of about B, and little improvement is noted as the amount of dichloroalkane is increased. Therefore, while the present invention includes the use of sufficient dichloroalkane to form solutions having a viscosity between B and T, we prefer to use sufficient to yield a solution having a viscosity of about B to D and up to O, this amount of dichloroalkane usually ensuring that the viscosity is well above the critical minimum and yet substantially short of the gel stage. Any excess dichloroalkane employed is readily stripped off after the desired amount has reacted.

Higher viscosities are not so objectionable when other methods are employed. Thus a polyalkylenepolyamine having a viscosity of W on the same basis is readily prepared by homopolymerization of polyethylenimine.

The alkylenepolyamine-dichloroalkane reaction is advantageously carried out by the use of water as solvent, and where the amount of acid evolved is large compared to the number of nitrogen atoms present, an acid acceptor such as triethanolamine, triethylamine, or N-methylmorpholine may be used.

Either of the two principal reagents may be added in increments as desired. The reaction is most advantageously continued until substantially all of the originally organically-bound chlorine has been converted into ionic form, this ensuring formation of polyalkylenepolyamines of desirable large size. Normally the reflux temperature remains constant for some length of time, then rises rapidly, and then levels off. Cessation of the rapid temperature rise is indicative of substantially complete reaction of the dichloroalkane.

In place of the high molecular weight parent polyalkylenepolyamines prepared by polyamine-dichloroalkane condensation as described, any polyalkylenepolyamine of requisite high viscosity may be employed including polyethylenimine. Polyethylenimine is composed of repetitive —$CH_2CH_2NH$— linkages and is formed by homopolymerization of ethylenimine. The particular parent polyalkylenepolyamine employed is thus not a primary feature of the invention.

In the second step, after the initial reaction has been carried out to the viscosity range as set forth above, a sufficient amount of a strong water-soluble acid is added to the reaction mixture to form the complete polyamine salt. The amount of the acid which should be added to the mixture is easily calculated by those skilled in the art from the number of reactive amine groups and halogen atoms present in the initial reactants, allowance being made for the neutralizing effect of any acid acceptor added. The acids that may be added to the reaction mixture are those known to be suitable for neutralizing amines, and include hydrochloric, hydrobromic, hydroiodic, sulfuric and formic acids and the like. By adding a sufficient amount of the acid to the reaction product, the complete polyamine salt is thus formed.

In the third principal step, the polyamine salt formed is reacted with a water-soluble metal cyanate or water-soluble metal thiocyanate in aqueous solution. The alkali metal compounds, such as lithium, sodium and potassium are preferred. Representative of cyanate and thiocyanate compounds that may be employed in our invention are lithium cyanate, sodium cyanate, potassium cyanate, sodium thiocyanate, potassium thiocyanate, and mixtures thereof. The amount of cyanate or thiocyanate used should be at least sufficient to react with about 80% of the nitrogen atoms of the polyalkylenepolyamine reactive therewith. For this purpose, at least about 0.9 mol of the cyanate should be added per nitrogen atom of the polyalkylenepolyamine salt. A considerable improvement takes places as the amount of cyanate or thiocyanate is increased and an excess does no harm. We therefore prefer to add 1.2 to about 1.5 mols of cyanate or thiocyanate per nitrogen atom of the polyalkylenepolyamine. The reaction is exothermic and is complete when the exotherm or exothermic heat of reaction ceases. The reaction takes place between room temperature and the reflux temperature of the mixture. Preferably, however, it is carried out between about 50° C. and about 80° C., 5 minutes to about 45 minutes usually being required. The reaction does not cause any cross-linking of the polyalkylenepolyamine chains to take place, as a result of which there is little danger of gelation.

The fourth step in the formation of the resinous composition of our invention is to react formaldehyde wtih the cyanate or thiocyanate-treated polyalkylenepolyamine. While it is preferred to employ formaldehyde for this purpose, other compounds engendering formaldehyde such as paraformaldehyde and trioxane may be employed if desired. The amount of the formaldehyde used should be at least sufficient to form a thermo-setting resin, and for convenience, is based on the mols of the cyanate or thiocyanate added to the reaction mixture. Thus, from about 1:1 to about 3:1 or more, preferably 1:1 to 2:1, mols of formaldehyde per mol of the cyanate or thiocyanate will be introduced into the reaction mixture, but an excess does no harm. Reaction is carried out at temperatures ranging from about 25° C. up to the reflux temperature of the mixture. This reaction is carried out at a pH that is neutral, acid, or alkaline, the object being to obtain a water-soluble resin which thermo-sets at an acid pH. Best control of the reaction is afforded by performing the condensation at a pH between about 7 and 10. While the reaction takes place at room temperature, it proceeds faster at elevated temperatures at about 60°–90° C., from about 10 to about 180 minutes, preferably from about 30 to about 120 minutes being allowed.

The condensate is prepared for use by cooling and dilution with water. To facilitate metering and uniform distribution through the paper fibers, the solutions are generally diluted to about 2–15% resin solids content. They require no aging before use.

The solutions obtained are colloidal aqueous dispersions of resinous macromolecules which bear a strong cationic charge. In some instances, the solutions exhibit a colloidal haze, whereas in other instances they appear completely clear, although they may be tinted faintly yellow. The colloidal character of the resin particles, however, is evidenced by the fact that the salt formed in the reaction, principally sodium halide or potassium halide, may be separated from the bulk of the resin particles by subjecting dilute solutions of the resin to dialysis in a dialyzer provided with a cellophane membrane.

In order that those skilled in the art may more fully understand the inventive concept herein presented, the following examples are given by way of illustration and not limitation.

*Example 1*

Resin 1–A.—A preferred resin of the present invention is prepared as follows. It will be noted that 3 carbon atoms are present between the chlorine atoms of the dihaloalkane and that the number of linear carbon atoms in the alkylene groups of the polyamine is 2, or a total of 5. As a result, the reaction product obtained in the first step of the synthesis is a very high molecular weight polyalkylenepolyamine of great length resulting from the fact that it contains a low proportion of six-membered rings.

A mixture of 56.5 grams of 1,3-dichloropropane, 62 cc. of water and 73 grams of triethylenetetramine was refluxed gently for three hours. The product was diluted with 157 cc. of water and cooled. The polymer syrup, now containing 37.2% total solids and 33% resin solids by weight had a Gardner-Holdt viscosity of D measured at 25° C. By titration, all the chlorine was found to have been converted into the form of chloride ions.

174 grams of the above polymer syrup (33%) was neutralized with 48.8 cc. of 37.5% hydrochloric acid to form a complete polymeric amine hydrochloride. 84.5 grams of 96% potassium cyanate was added and the mixture reacted for one hour at 75° C. 162 grams of 37% aqueous formaldehyde was added. The pH of the solution was alkaline. The solution was heated at 55° C. for 30 minutes and the resulting resin was diluted to 15% solids and cooled. The resin had excellent storage stability.

Resin 1–B.—This resin is substantially the same as the foregoing, except that the total number of carbon atoms between the chlorine atoms of the dihaloalkane plus the linear carbon atoms of the alkylene group of the polyalkylenepolyamine was only 4. The high molecular weight polyalkylenepolyamine obtained had a much lower viscosity indicative of lower molecular size and shorter chain length, best explained on the assumption that it contained a larger number of six-membered alicyclic rings than resin 1–A.

99 grams of 1,2-dichloroethane, 50 cc. of water, and 146 grams of triethylenetetramine were mixed together and slowly heated to 65° C. An exothermic reaction developed which brought the mixture to reflux (80° C.). Cooling and heating were applied to maintain a gentle reflux. The solution was refluxed for about three hours during which time the temperature gradually rose to 100° C. The mixture was kept at 100°–105° C. for 75 minutes. It was then cooled and 200 cc. of water were added to dilute the reaction product to 34.6% resin solids, or 49.5% total solids. Its viscosity on the Gardner-Holdt scale at 25° C. was between A1 and A. By titration, it was found that all the chlorine was converted to the form of chloride ions.

124 grams of the solution prepared as described above was neutralized with 48.6 grams of 37.5% hydrochloric acid, this, with the hydrogen chloride already present, being sufficient to neutralize all the nitrogen atoms present and thus form the complete amine salt. 84.5 grams of potassium cyanate of 96% purity was added and an exothermic reaction developed which brought the temperature to 80° C. The reaction mixture was kept at 75° C. for 30 minutes. 100 cc. of water and 162 grams of 37% formaldehyde were added and the reaction mixture was maintained at 70° C. for 30 minutes. The resulting syrup had a resin solids content of 15%. Its pH was 8.5.

*Example 2*

This resin is another preferred resin of the present invention. In this resin the number of linear carbon atoms in the alkylene group in the polyalkylenepolyamine plus the number of carbon atoms between the chlorine atoms in the dihaloalkane totals 5. The resin thus contains a decreased proportion of six-membered alicyclic rings.

A mixture of 131.2 grams of 3,3'-iminobispropylamine, 87.5 grams of 1,2-dichloroethane, and 50 cc. of water was refluxed for two hours, after which 200 cc. of water was added. The resulting resin had a viscosity at 25° C. of N on the Gardner-Holdt scale at 33% resin solids content. At this point substantially all of the 1,2-dichloroethane had reacted. 156 grams of the above resinous syrup was neutralized with 40 cc. of 37.5% hydrochloric acid. The polyamine hydrochloride solution thus formed was then reacted with 84 grams of potassium cyanate for two hours at 75° C. To this condensate 162 grams of a 37% aqueous solution of formaldehyde was added and reacted for 15 minutes at 68° C. The final resinous syrup was diluted to 13.8% resin solids with water. The syrup had a slightly alkaline pH.

A resin of equal usefulness is obtained when the 1,2-dichloroethane used above is replaced by 1,3-dichloropropane. Since, in this case, the number of carbon atoms in the alkylene group of the polyalkylenepolyamine plus the number of carbon atoms between the chlorine atoms of the dihaloalkane totals 6, the resin is completely free from six-membered alicyclic rings.

Example 3

The foregoing resin dispersions were diluted with water to a solids content of 2.0% by volume and employed in the manufacture of paper as follows.

A stock of bleached northern kraft pulp was prepared and beaten to a freeness of 500 ml. (Green), diluted to a consistency of 0.6%, and aliquots withdrawn.

One aliquot was retained as control and to this nothing was added.

To other aliquots was added sufficient of the respective resin solutions shown above to provide the weights of resin solids shown in the table below.

After addition of the resin, the aliquots were stirred briefly to distribute the resin therethrough, and their pH adjusted to 4.5 by the addition of aqueous hydrochloric acid.

The aliquots were sheeted on a Nash handsheet machine using dilution water adjusted to a pH of 4.5 with hydrochloric acid and the handsheets were dried for one minute at 240° F. The sheets were then conditioned for about 24 hours at 73° F. and 50% relative humidity, and were tested as shown in the table below. Results are as follows.

| Resin | | Percent Added [2] | Basis Wt.[3] | Tensile Strength [4] | |
|---|---|---|---|---|---|
| Example | Made From [1] | | | Dry | Wet [5] |
| Control | | Nil | 45.2 | 28.0 | 0.7 |
| 1-A | TETA+ClPrCl | 0.5 | 48.4 | 34.0 | 7.8 |
| 1-A | TETA+ClPrCl | 1.0 | 49.0 | 35.3 | 10.2 |
| 1-B | TETA+ClEtCl | 0.5 | 46.0 | 29.4 | 1.6 |
| 1-B | TETA+ClEtCl | 1.0 | 45.2 | 29.2 | 2.5 |
| 2-A | IBPA+ClEtCl | 0.25 | 45.4 | 33.0 | 5.7 |
| 2-A | IBPA+ClEtCl | 0.5 | 45.2 | 34.1 | 8.9 |
| 2-A | IBPA+ClEtCl | 1.0 | 45.7 | 35.0 | 11.0 |
| 2-A | IBPA+ClEtCl | 2.0 | 45.4 | 37.3 | 14.4 |
| 2-A | IBPA+ClEtCl | 3.0 | 45.2 | 36.6 | 16.8 |

[1] TETA=Triethylene tetramine; ClPrCl=1,3-dichloropropane; ClEtCl=1,2-dichloroethane; IBPA=3,3'-iminobispropylamine.
[2] Resin solids on dry weight of fibers.
[3] Lb./25″ x 40″/500 ream.
[4] Lb. per inch, corrected to 50 lb. basis weight.
[5] After 16 hr. soak in deionized water at 73° F.

From the table it will be seen that the results obtained with resins 1-A and 2-A were far superior to the results obtained with resin 1-B. The unsatisfactory performance of resin 1-B was due to the fact that the sum of carbon atoms in the alkylene group in the amine and the carbon groups between the chlorine atoms of the chloroalkane was 4. The resin contained six-membered rings as a result of which the resin was of insufficient molecular size and length.

Subsequent laboratory work showed that substantially identical results are obtained when the pH adjustment referred to above is made by the use of sulfuric acid or alum. It has further been found that the greatest increase in wet strength per unit weight of resin added occurs when the resin solids added is less than about 2% of the dry weight of the paper, and particularly less than about 1%, larger amounts acting to increase the wet strength but not in proportion to the weight of resin added.

From still further work, it has been found that the paper need only be heated at a temperature above about 180° F. until substantially dry to substantially develop the wet strength properties of the resin, and that the remainder of the wet strength is developed as the paper ages on storage at room temperature, substantially all being developed during the first ten days thereof.

Example 4

The manufacture of wet strength paper by the "tub" method is illustrated by the following.

Solutions were prepared by mixing respectively 100, 50, and 25 grams of a 2% solution of resin 1-A of Example 1 with 150 grams of water, and adjusting the pH to 4.5 by the addition of dilute alum solution. A sheet of rosin-sized bleached kraft paper of basis weight 42 lb. per 25″ x 40″/500 ream was torn into strips. One strip was retained as control, and strips were immersed into the test solution, run through wringer rolls, blotted dry, dried at 240° F. for one minute, and their resin content determined. The products were tested to determine their wet tensile strength with the following results.

| Gm. Resin Solution Added | Percent Resin In Paper | Wet Strength, Lb./in. |
|---|---|---|
| Control | Nil | 1.2 |
| 100 | 0.95 | 4.9 |
| 50 | 0.48 | 4.1 |
| 25 | 0.24 | 3.2 |

Additional resins suitable for the practice of the present invention are disclosed and claimed in our copending application Serial No. 435,931, filed on June 10, 1954, now Patent 2,834,756.

Example 5

The following illustrates the preparation of a poly-(methylolcarbamyl) polyalkylenepolyamine resin from polyethylenimine. The polyethylenimine was the commercial material known as "Polymin P" which was entirely free from six-membered rings, and had a Gardner-Holdt viscosity of W as a 33% aqueous solution at 25° C.

To 95.6 gm. of a 45% aqueous solution of the above polyethylenimine (1 mol equivalent) was added 100 cc. of water and 97.5 gm. of 37.5% aqueous hydrochloric acid, followed by 85.5 gm. of potassium cyanate. The mixture was allowed to react at 55° C. for thirty minutes, after which 162 gm. of 37% aqueous formaldehyde and 250 cc. of water were added. The mixture was reacted for thirty minutes at 70° C. The product had a pH of 8, and a theoretical resin solid content of 14.5%. It exhibited a distinct colloidal opacity.

Example 6

The resin of Example 5 was tested as strengthening agent for paper in accordance with the method of Example 3 employing a different sample of bleached northern craft pulp. The results were as follows:

| Percent Resin Added [1] | Basis Wt.[2] | Tensile Strength [3] | |
|---|---|---|---|
| | | Dry | Wet [4] |
| Nil | (48.8) | (25.6) | 0.6 |
| 0.25 | 49.3 | 26.2 | 4.7 |
| 0.5 | 48.6 | 32.0 | 7.3 |
| 1.0 | 48.4 | 33.3 | 9.5 |

[1] Resin solids or dry weight of fibers.
[2] Lb./25″ x 40″/50 ream.
[3] Lb./inch, corrected to 50 lb. basis cut.
[4] After 16-hour soak in deionized water at 73° F.

We claim:
1. A cellulose web of improved wet and dry strength composed of cellulosic fibers bonded together by a content of 0.05% to 5%, based on the dry weight of the fibers, of a normally water-soluble thermosetting poly-(N-methylolcarbamyl) polyalkylenepolyamine resin in thermo-cured form, the methylolcarbamyl groups of said resin before conversion to thermo-cured form having the theoretical formula

—C(:X)NHCH₂OH wherein X is selected from the group consisting of oxygen and sulfur, said resin being prepared by reacting an essentially acyclic polyalkylenepolyamine having a molecular size such that 33% by weight aqueous solution thereof has a viscosity of at least B at 25° C. on the Gardner-Holdt scale, first with a water-soluble metal cyanate and then with formaldehyde.

2. A web according to claim 1 wherein the viscosity of the polyalkylenepolyamine is less than O.

3. A process according to claim 1 wherein the polyalkylenepolyamine is formed from recurring —HN—CH₂CH₂NH— and —HN—CH₂CH₂CH₂NH— linkages.

4. A process according to claim 1 wherein the essentially acyclic polyalkylenepolyamine is polymerized ethylenimine.

5. A cellulosic web of improved wet and dry strength composed of cellulosic fibers bonded together by an adsorbed content of about 0.05% to 5%, based on the dry weight of the fibers, of a normally water-soluble thermosetting resin in thermo-cured form, said resin being formed by first reacting a water-soluble alkylenepolyamine having at least 2 and not more than 4 linear alkylene carbon atoms with sufficient of a dichloroalkane containing a total of not more than about 4 carbon atoms and containing at least 2 and not more than 3 carbon atoms between the chlorine atoms thereof, the number of carbon atoms between the chlorine atoms of said dichloroalkane plus the number of linear alkylene carbon atoms of the alkylenediamine being at least 5 to form a reaction product an aqueous solution of which at 25° C. containing 33% by weight of resin solids has a viscosity between about B and T on the Gardner-Holdt scale, whereby a high molecular weight polyalkylenepolyamine is formed and formation of six-membered alicyclic rings therein is in substantial part avoided, reacting said polyalkylenepolyamine in the form of a salt with a material selected from the group consisting of the water-soluble metal cyanates and thiocyanates, the amount of said material being sufficient to react with at least about 80% of the nitrogen atoms of the polyalkylenepolyamine, and reacting said polyalkylenepolyamine with formaldehyde to obtain a water-soluble thermo-setting resin.

6. A web according to claim 5 wherein the weight of the resin is 0.1%–1% of the weight of the fibers.

7. A web according to claim 5 wherein the alkylenepolyamine is diethylenetriamine and the dichloroalkane is 1,3-dichloropropane.

8. A web according to claim 5 wherein the alkylenepolyamine is 3,3'-iminobispropylamine.

9. A web according to claim 8 wherein the high molecular weight polyalkylenepolyamine is reacted with an alkali metal cyanate.

10. A cellulosic web of improved wet and dry strength composed of cellulosic fibers bonded together by an adsorbed content of 0.1% to 5%, based on the dry weight of the fibers, of a normally water-soluble thermo-setting polyalkylenepolyamine resin in thermo-cured form, said resin being formed by reacting 1 mol of an alkylenepolyamine of the formula H₂N(C_mH_{2m}NY)_pC_mH_{2m}NH₂ wherein Y is selected from the group consisting of H and C_mH_{2m}NH₂, m is an integer of from 2 to 3, and p is an integer from 0 to 5, with between about 0.6 and 1.2 mols of a dichloroalkane containing a total of not more than about 4 carbon atoms and containing at least 2 and not more than 3 carbon atoms between the chlorine atoms thereof, the number of carbon atoms between the chlorine atoms of said dichloroalkane plus the number of linear carbon atoms of said alkylenepolyamine being at least 5, whereby a high molecular weight polyalkylenepolyamine is formed and formation of six-membered alicyclic rings is in substantial part avoided, adding sufficient acid to form a complete polyalkylenepolyamine salt, reacting therewith about 0.9 to about 1.5 mols of an alkali metal cyanate, and then reacting therewith at an alkaline pH from about 1 to 3 mols of formaldehyde per mol of cyanate added.

11. A method of manufacturing a cellulosic web of increased wet and dry strength, which comprises contacting cellulosic fibers with sufficient of a dilute acidic solution of a thermosetting poly(N-methylolcarbamyl) polyalkylenepolyamine resin to deposit from 0.05% to 5% of said resin on said fibers based on the dry weight of said fibers, and heating said fibers at 200–250° F. for ½ to 3 minutes to dry the same and develop the strengthening properties of the resin thereon, the poly(methylolcarbamyl) content of said resin before conversion to thermo-cured form having the theoretical formula

—C(:X)NHCH₂OH wherein X is selected from the group consisting of oxygen and sulfur, said resin being prepared by reacting an essentially acyclic polyalkylenepolyamine having a molecular size such that a 33% by weight aqueous solution thereof has a viscosity of at least B at 25° C. on the Gardner-Holdt scale, first with a water-soluble metal cyanate and then with formaldehyde.

12. A method of manufacturing a cellulosic web of increased wet and dry strength which comprises forming an aqueous suspension of cellulosic fibers, adding thereto an aqueous dispersion containing from about 0.05% to 5% based on the dry weight of the fibers of a polyalkylenepolyamine-formaldehyde resin in colloidal cationic form, said resin being formed by reacting an alkylenepolyamine having alkylene groups containing at least 2 and not more than 4 linear carbon atoms with sufficient of a dichloroalkane containing a total of not more than about 4 carbon atoms and containing at least 2 and not more than 3 carbon atoms between the chlorine atoms thereof, the number of carbon atoms between the chlorine atoms of said dichloroalkane plus the number of linear carbon atoms in any alkylene group of the alkylenediamine being at least 5 to form a reaction product an aqueous solution of which at 25° C. containing 33% by weight of resin solids has a viscosity between about B and T on the Gardner-Holdt scale, whereby a high molecular weight polyalkylenepolyamine is formed and formation of six-membered alicyclic rings therein is, in substantial part, avoided, reacting said polyalkylenepolyamine in the form of a salt with a material selected from the group consisting of the water-soluble metal cyanates and thiocyanates, the amount of said material being sufficient to react with at least 80% of the nitrogen atoms of the polyalkylenepolyamines, and then reacting with formaldehyde to obtain a water-soluble thermo-setting resin, sheeting said fibers at an acid pH and heating said fibers at a temperature between about 200°–250° F. to dry the same and develop the wet strength properties of the resin thereon.

13. A process according to claim 12 wherein the fibers are beaten cellulosic papermaking fibers.

14. A process according to claim 12 wherein the pH of the aqueous fibrous suspension on addition of the dilute resin solution is about 4–6.

15. A process according to claim 12 wherein the weight of resin added is about 0.1% to 1% of the dry weight of the fibers.

16. A process according to claim 12 wherein the fibers are cellulosic fibers which have been rosin-sized.

17. A method of manufacturing a cellulosic web of increased wet and dry strength which comprises forming an aqueous suspension of cellulosic fibers, adding thereto an aqueous dispersion containing from about 0.05% to 5% based on the dry weight of the fibers of a cyanated polyalkylenepolyamine-formaldehyde resin in colloidal cationic form, said resin being formed by reacting 1 mol of an alkylenepolyamine of the formula $$H_2N(C_mH_{2m}NY)_pC_mH_{2m}NH_2$$

wherein Y is selected from the group consisting of H and $C_mH_{2m}NH_2$, $m$ is an integer of from 2 to 3, and $p$ is an integer from 0 to 5 with between about 0.6 and 1.2 mols of a dichloroalkane containing a total of not more than about 4 carbon atoms and containing at least 2 and not more than 3 carbon atoms between the chlorine atoms thereof, the number of carbon atoms between the chlorine atoms of said dichloroalkane plus the number of linear carbon atoms of said alkylenepolyamine being at least 5, whereby a high molecular weight polyalkylenepolyamine is formed and formation of six-membered alicyclic rings is, in substantial part, avoided, adding sufficient acid to form a complete polyalkylenepolyamine salt, reacting therewith about 0.9 to about 1.5 mols of an alkali metal cyanate, and reacting therewith at an alkaline pH from about 1 to 3 mols of formaldehyde per mol of cyanate added, sheeting said fibers to form a web and heating said web at about 200–250° F. for about ½ to 3 minutes to dry the same and to develope strengthening properties of the resin thereon.

References Cited in the file of this patent

UNITED STATES PATENTS

| | | |
|---|---|---|
| 2,616,874 | Yost et al. | Nov. 4, 1952 |
| 2,734,890 | Bortnick | Feb. 14, 1956 |

FOREIGN PATENTS

| | | |
|---|---|---|
| 474,601 | Great Britain | Nov. 1, 1937 |

OTHER REFERENCES

Houben-Weyl: "Methoden der Organishen Chemie," Vierte Auflage, Band VIII, published by George Thieme Verlag, Stuttgart, 1952, pages 151 and 156.

UNITED STATES PATENT OFFICE

Certificate of Correction

Patent No. 2,885,318                                                               May 5, 1959

Yun Jen et al.

It is hereby certified that error appears in the printed specification of the above numbered patent requiring correction and that the said Letters Patent should read as corrected below.

Columns 13 and 14, headed by Patent Number "2,885,318", which were inadvertently omitted, should be added as part of the official grant (only) of the above numbered patent:

2,885,318

13 an aqueous dispersion containing from about 0.05% to 5% based on the dry weight of the fibers of a cyanated polyalkylenepolyamine-formaldehyde resin in colloidal cationic form, said resin being formed by reacting 1 mol of an alkylenepolyamine of the formula $$H_2N(C_mH_{2m}NY)_pC_mH_{2m}NH_2$$

wherein Y is selected from the group consisting of H and $C_mH_{2m}NH_2$, m is an integer of from 2 to 3, and p is an integer from 0 to 5 with between about 0.6 and 1.2 mols of a dichloroalkane containing a total of not more than about 4 carbon atoms and containing at least 2 and not more than 3 carbon atoms between the chlorine atoms thereof, the number of carbon atoms between the chlorine atoms of said dichloroalkane plus the number of linear carbon atoms of said alkylenepolyamine being at least 5, whereby a high molecular weight polyalkylenepolyamine is formed and formation of six-membered alicyclic rings is, in substantial part, avoided, adding sufficient acid to form a complete polyalkylenepolyamine

14 salt, reacting therewith about 0.9 to about 1.5 mols of an alkali metal cyanate, and reacting therewith at an alkaline pH from about 1 to 3 mols of formaldehyde per mol of cyanate added, sheeting said fibers to form a web and heating said web at about 200-250° F. for about ½ to 3 minutes to dry the same and to develop strengthening properties of the resin thereon.

References Cited in the file of this patent

UNITED STATES PATENTS 2,616,874    Yost et al. _____ Nov. 4, 1952
2,734,890    Bortnick _____ Feb. 14, 1956

FOREIGN PATENTS 474,601    Great Britain _____ Nov. 1, 1937

OTHER REFERENCES

Houben-Weyl: "Methoden der Organishen Chemie," Vierto Auflage, Band VIII, published by George Thieme Verlag, Stuttgart, 1952, pages 151 and 156.

Signed and sealed this 8th day of September 1959.

[SEAL]

Attest:
KARL H. AXLINE,
*Attesting Officer.*

ROBERT C. WATSON,
*Commissioner of Patents.*